United States Patent
Sohmshetty et al.

(10) Patent No.: US 11,960,621 B2
(45) Date of Patent: Apr. 16, 2024

(54) SYSTEMS AND METHODS FOR ENSURING PRIVACY IN AN AUTONOMOUS VEHICLE

(71) Applicant: Ford Global Technologies, LLC, Dearborn, MI (US)

(72) Inventors: Raj Sohmshetty, Canton, MI (US); Vikas Rajendra, Novi, MI (US); Scott Mayberry, East Point, GA (US)

(73) Assignee: Ford Global Technologies, LLC, Dearborn, MI (US)

( * ) Notice: Subject to any disclaimer, the term of this patent is extended or adjusted under 35 U.S.C. 154(b) by 509 days.

(21) Appl. No.: 17/171,085

(22) Filed: Feb. 9, 2021

(65) Prior Publication Data

US 2022/0253550 A1 Aug. 11, 2022

(51) Int. Cl.
*G06F 21/00* (2013.01)
*G05D 1/00* (2006.01)
*G06F 21/62* (2013.01)
*G06T 11/00* (2006.01)
*G06V 20/59* (2022.01)
*G06V 40/20* (2022.01)
*H04N 7/18* (2006.01)
*H04W 4/029* (2018.01)
(Continued)

(52) U.S. Cl.
CPC ....... *G06F 21/6245* (2013.01); *G05D 1/0212* (2013.01); *G06T 11/00* (2013.01); *G06V 20/593* (2022.01); *G06V 40/20* (2022.01); *H04N 7/181* (2013.01); *H04W 4/029* (2018.02); *H04W 4/44* (2018.02); *B60Q 9/00* (2013.01); *B60W 60/0013* (2020.02); *G06F 2221/2107* (2013.01); *H04N 7/188* (2013.01)

(58) Field of Classification Search
CPC ... G06F 21/6245; G05D 1/0212; G06T 11/00; G06V 20/593; G06V 40/20; H04N 7/181; H04W 4/029; H04W 4/44
See application file for complete search history.

(56) References Cited

U.S. PATENT DOCUMENTS

| 8,836,784 B2 | 9/2014 | Erhardt et al. |
| 10,562,737 B2 | 2/2020 | Friedli et al. |

(Continued)

OTHER PUBLICATIONS

Butt et al., "Privacy Management in Social Internet of Vehicles: Review, Challenges and Blockchain Based Solutions", IEEE Access, accepted Jun. 3, 2019, date of publication Jun. 12, 2019, date of current version Jul. 1, 2019 (Year: 2019).*

(Continued)

*Primary Examiner* — Morshed Mehedi
(74) *Attorney, Agent, or Firm* — Brandon Hicks; Eversheds Sutherland (US) LLP

(57) ABSTRACT

Systems and methods for protecting privacy for safety, comfort, and infotainment of one or more occupants of an autonomous vehicle are disclosed. For example, the system may capture image data indicative of an interior of the autonomous vehicle via one or more cameras integrated with the autonomous vehicle. The captured image data is then transformed to remove personal identification information of the one or more occupants, and the transformed image data may be analyzed to identify a concern, e.g., an occupant safety concern or a vehicle safety concern. The level of concern may be determined, and a mitigation strategy may be deployed based on the safety concern identified.

19 Claims, 6 Drawing Sheets

(51) Int. Cl.
*H04W 4/44* (2018.01)
*B60Q 9/00* (2006.01)
*B60W 60/00* (2020.01)

(56) References Cited

U.S. PATENT DOCUMENTS

| | | |
|---|---|---|
| 2003/0041329 A1 | 2/2003 | Bassett |
| 2014/0043479 A1 | 2/2014 | Busch et al. |
| 2014/0203085 A1* | 7/2014 | Park .................... G06F 16/9554 |
| | | 235/494 |
| 2018/0068192 A1* | 3/2018 | Miller ................... G06V 20/593 |
| 2018/0126960 A1* | 5/2018 | Reibling ................ G05D 1/021 |
| 2020/0404465 A1* | 12/2020 | Manicka ............... H04W 4/024 |
| 2021/0182617 A1* | 6/2021 | Kondo ................... G06V 40/23 |
| 2021/0287332 A1* | 9/2021 | Gayatri ................ G06V 40/161 |
| 2021/0358492 A1* | 11/2021 | Kim ....................... B60W 50/10 |
| 2022/0121774 A1* | 4/2022 | Ki ............................ H04W 4/48 |
| 2022/0189004 A1* | 6/2022 | Stluka .................... G05B 15/02 |

OTHER PUBLICATIONS

Bosch Mobility Solutions, "Interior Monitoring Systems", Robert Bosch GmbH, Sep. 12, 2020, 9 pages.
Buzz Auto Media AI Analytics, "Affectiva Automotive AI: In-Cabin Sensing", 2018, 12 pages.

\* cited by examiner

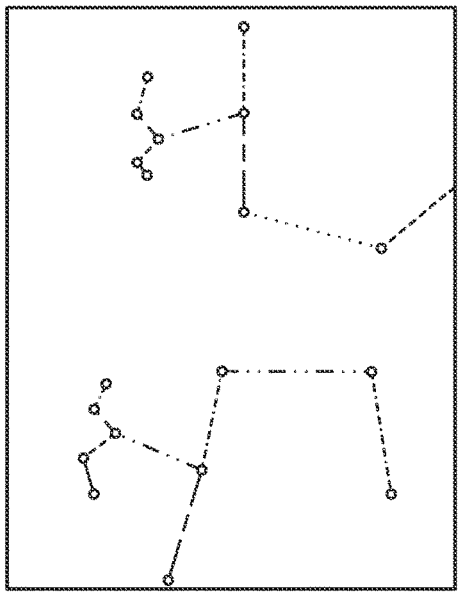
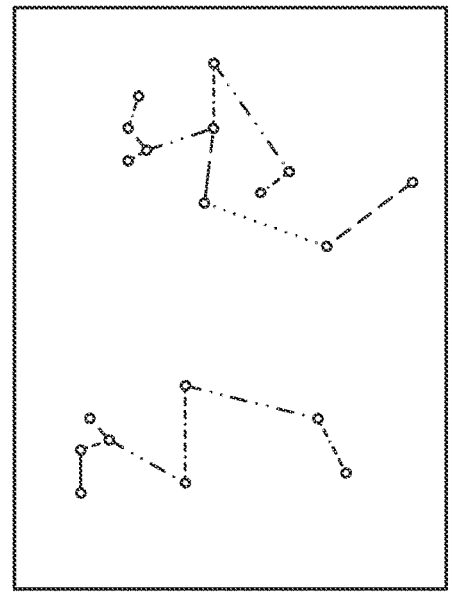
FIG. 6A
FIG. 6B

SYSTEMS AND METHODS FOR ENSURING PRIVACY IN AN AUTONOMOUS VEHICLE

BACKGROUND

The interior of an autonomous vehicle (AV) may be monitored with one or more sensors, such as a camera or the like, to ensure the comfort and safety of the users. The use of a camera, however, may raise privacy concerns for the users. Therefore, there is a need to build and provide automated systems and methods that will ensure the safety and comfort of the occupants of the AV and prevent any damage to the AV while also ensuring the privacy of the riders. It is with respect to these and other considerations that the disclosure made herein is presented.

BRIEF DESCRIPTION OF THE DRAWINGS

FIGS. 6A and 6B illustrate pose estimation in accordance with the principles of the present disclosure.

DETAILED DESCRIPTION

Overview

Figure 1:
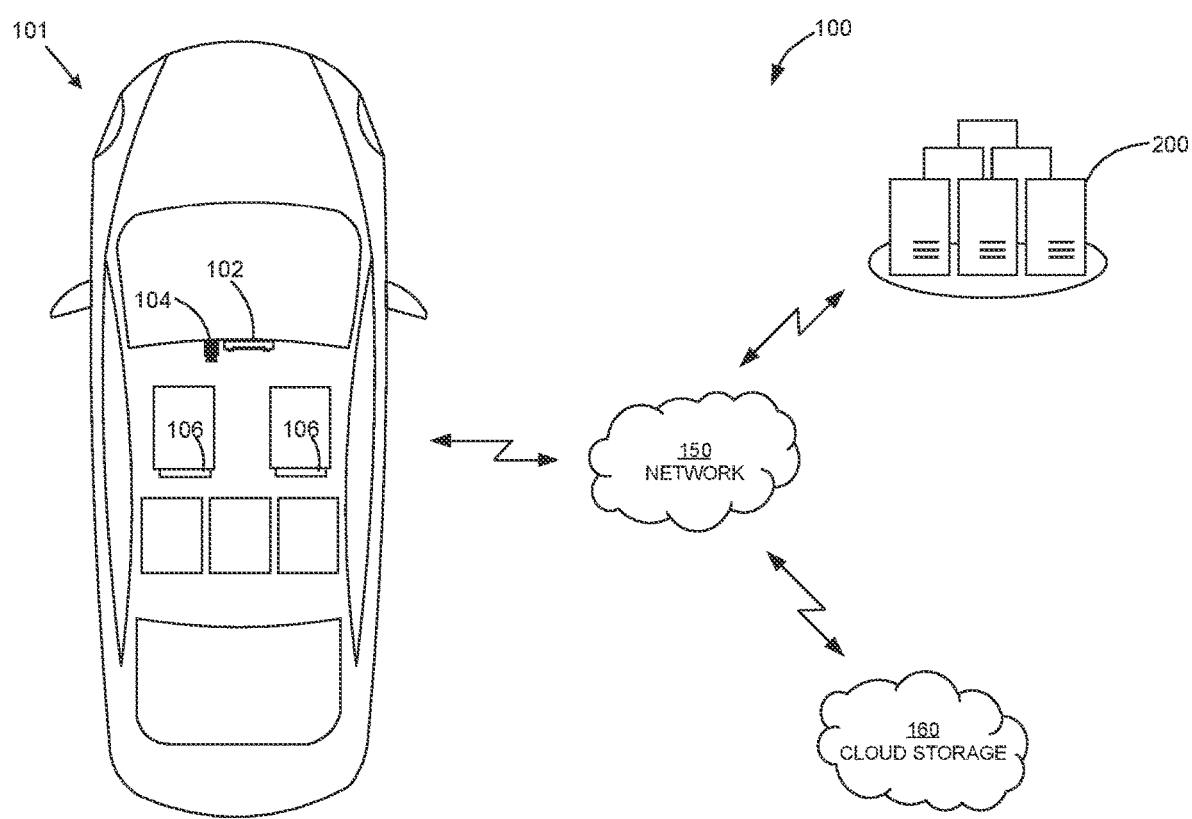
FIG. 1 illustrates a system for protecting privacy of one or more occupants of an autonomous vehicle in accordance with the principles of the present disclosure.

Disclosed are systems and methods for monitoring the interior of an autonomous vehicle, e.g., a ridehail vehicle, to ensure the safety and comfort of occupants and to prevent vehicle damage while protecting the privacy of the occupants. In some instances, the system is a Privacy Protected Safety, Comfort, and Infotainment (PPSCI) system and includes one or more cameras that capture information about the interior of the vehicle to achieve a full view of the interior of the vehicle. The system may include two operating modes. The first mode may be a normal mode in which the cameras capture video of the cabin of the vehicle and either store it locally or send it to the cloud. This may be performed continuously or based on a triggering event. The second mode may be a privacy mode in which video may be obtained and then transformed to remove any personally identified information. This transformed video may then be analyzed to identify any safety/comfort concerns and appropriate action may be taken to adjust the autonomous vehicle appropriately. The occupant may have the option to view the transformed video. Additionally, the system may switch between the first mode and the second mode based on usage patterns, a pre-determined policy, or through manual adjustments by the occupant.

In certain embodiments, pose estimation is an example approach to anonymize user data. By scrubbing all recognizable features from the recording, and only saving the pose estimations, occupants may be protected from tracking software or hacks. If an occupants slouches over, they may be experiencing a stroke, a seizure, or passing out from alcohol consumption. With pose estimation, the vehicle can detect these occupants' emergency situations and begin to deploy mitigation strategies. As an example, the vehicle may first audibly request a response from the occupants. When there is no response, the vehicle may direct itself to a hospital or call emergency services. By recording this data, deep learning models may be used to extract information in the future. The same pose estimation may be used to monitor for damage to the vehicle by the occupants or to identify a comfort level of the occupants.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, an exemplary system for protecting privacy of one or more occupants of an autonomous vehicle is provided. System 100 may include PPSCI platform 200 and vehicle 101 having control module 102, one or more cameras 104, and one or more displays 106. PPSCI platform 200 may be located on one or more servers, e.g., stored on cloud 160 or on control module 102, and may communicate with control module 102, camera 104, and/or display 106 via network 150 as described in further detail below.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, PPSCI platform 200 may be configured and/or programmed to operate with a vehicle having a Level-4 or Level-5 autonomous vehicle controller.

Control module 102 of vehicle 101 may be operatively connected to the control modules of the electrical architecture of vehicle 101 for controlling, e.g., temperature within the interior of vehicle 101, individual seat temperature, seat configuration, the infotainment system of vehicle 101, cameras 102, and/or displays 106. In addition, control module 102 may be operatively coupled to a GPS system of vehicle 101 for determining the geographical location of vehicle 101. In some embodiments, control module 102 may house PPSCI platform 200. Control module 102 may include a graphical user interface for receiving user input as well as displaying information regarding vehicle 101.

One or more cameras 104 may be disposed within vehicle 101, and may capture image data, e.g., video, of the interior of vehicle 101. For example, cameras 104 may be positioned to capture image data of every occupant within vehicle 101. In some embodiments, cameras 104 further may capture image data of the entire interior of vehicle 101, e.g., where personal items may be placed or stored. Although FIG. 1 illustrates one camera, as will be understood by a person having ordinary skill in the art, more than one camera may be integrated with vehicle 101.

One or more displays 106 may be positioned within vehicle 101 such that display 106 may be observed by the occupants of vehicle 101. For example, as shown in FIG. 1, displays 106 may be positioned behind the front seats such that they are observable by occupants in the backseats. In some embodiments, display 106 may be integrated with control module 102. As will be understood by a person having ordinary skill in the art, more or less displays may be integrated with vehicle 101 than is depicted in FIG. 1.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, and/or man-to-machine communication.

Information shared between PPSCI platform 200, control module 102, cameras 104, and/or displays 106, may be stored on cloud storage 160 and may be bi-directional in nature. For example, in one case, image logging platform information may be transferred from PPSCI platform 200 to cloud storage 160. Such information stored on cloud storage 160 may be accessed and downloaded by remote devices such a remote computing device, e.g., devices used by authoritative persons such as law enforcement officers, devices used by emergency services provides, or devices used by persons associated with one or more occupants of vehicle 101 such as a parent and/or emergency contact.

Figure 2:
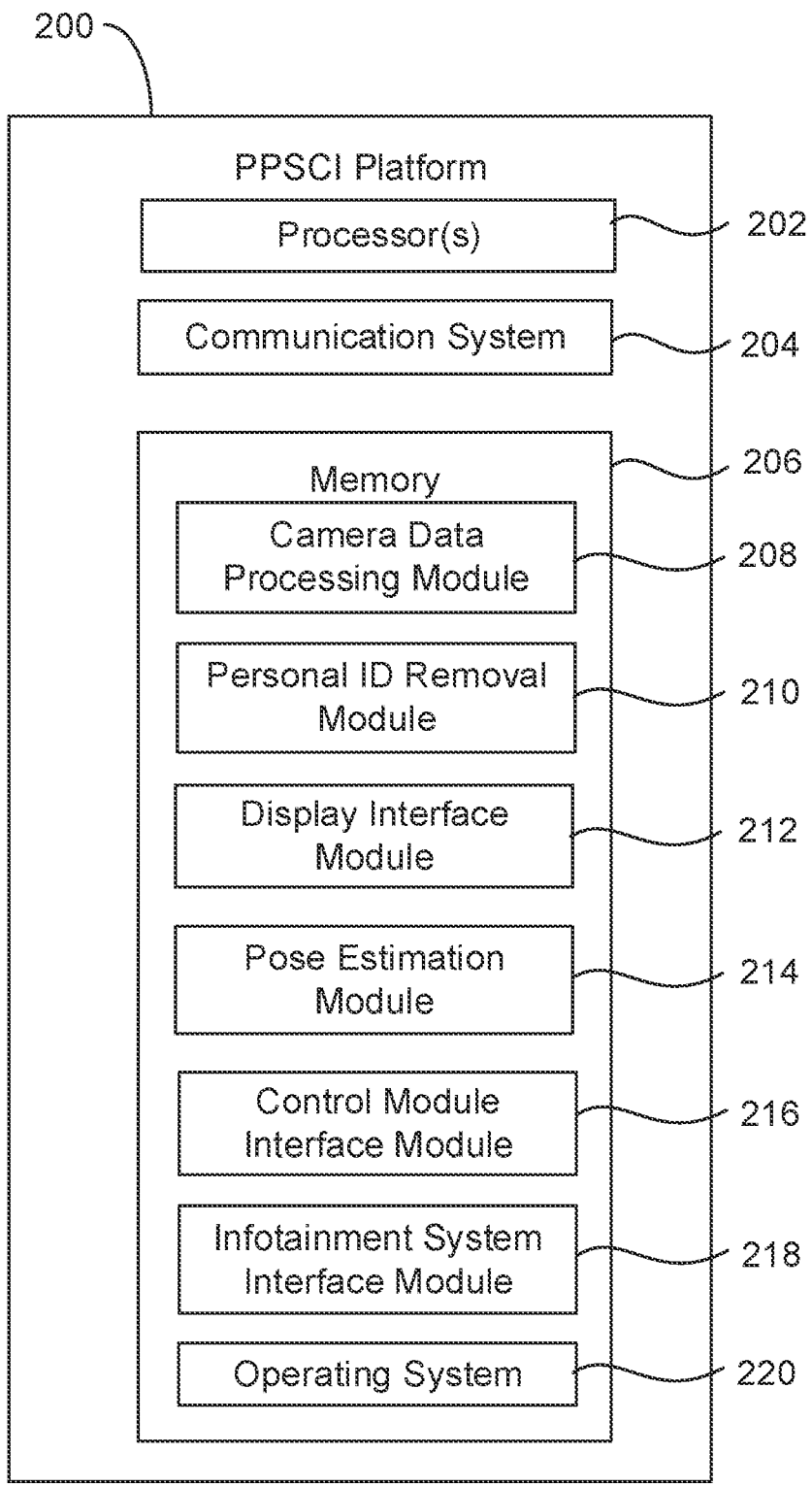
FIG. 2 shows some example components that may be included in PPSCI platform in accordance with the principles of the present disclosure.

Referring now to FIG. 2, components that may be included in PPSCI platform 200 are described in further detail. PPSCI platform 200 may include one or more processors 202, communication system 204, and memory 206. Communication system 204 may include a wireless transceiver that allows PPSCI platform 200 to communicate with control module 102, cameras 104, displays 106, and/or other remote devices. The wireless transceiver may use any of various communication formats, such as, for example, an Internet communications format, or a cellular communications format.

Memory 206, which is one example of a non-transitory computer-readable medium, may be used to store operating system (OS) 220, camera data processing module 208, personal ID removal module 210, display interface module 212, pose estimation module 214, control module interface module 216, and infotainment system interface module 218. The modules are provided in the form of computer-executable instructions that may be executed by processor 202 for performing various operations in accordance with the disclosure.

Camera data processing module 208 may be executed by processor 202 for receiving and processing image data, e.g., video, from cameras 104. Moreover, camera data processing module 208 may utilize object detection software to identify objects, e.g., bags, purses, books, sunglasses, branded items and clothing, food or drink containers, etc., within vehicle 101 from the captured image data.

Personal ID removal module 210 may be executed by processor 202 for removing personal identification (ID) information of the occupants captured in the image data received by camera data processing module 208, and generating transformed privacy protected image data including a digital representation of the occupants of vehicle 101 without personal identification (ID) information. For example, as shown in FIG. 6A, transformed privacy protected image data may include stick figures corresponding with the occupants captured in the image data received by camera data processing module 208 from camera 104. Alternatively, the transformed privacy protected image data may include other digital representations of the occupants that do not contain personal identification (ID) information of the occupants such as a preselected avatar, cartoon, licensed celebrity likeness, etc. Accordingly, the occupants of vehicle 101 may, at the onset of the trip upon entry of vehicle 101, select which digital representation they prefer to be used in the transformed privacy protected image data.

Display interface module 212 may be executed by processor 202 for displaying the transformed privacy protected image data on displays 106. Accordingly, the occupants of vehicles 101 may observe digital representations of themselves on display 106 in real-time, which may provide comfort that their image is not being recorded and that their privacy remains protected.

Pose estimation module 214 may be executed by processor 202 for detecting a concern, e.g., an occupant safety concern, a vehicle safety concern, or an occupant discomfort, based on the transformed privacy protected image data. For example, based on the transformed image data depicted in FIG. 6B, pose estimation module 214 may determine that the occupant on the right is engaging in an aggressive behavior toward the occupant on the left, e.g., an arm of the occupant on the right is observed to be moving quickly toward the occupant on the left. Moreover, pose estimation module 214 may predict aggressive behaviors using, e.g., machine learning, based on past behaviors detected by pose estimation module 214, as well as current transformed privacy protected image data based on capture image data in real-time.

In addition, if pose estimation module 214 detects an occupant safety concern, e.g., the occupant is stationary and not responding to an audible alert, the occupant is hunch over indicating the occupant is in pain or inebriated, one occupant is engaging in aggressive behavior with another occupant, one occupant is too close to another occupant, etc., pose estimation module 214 may determine the level of occupant safety concern, and determine a mitigation strategy based on the determined level of occupant safety concern. For example, if pose estimation module 214 determines that the occupant safety concern level is low, e.g., by comparing to the observed behavior to a database stored in, e.g., memory 206 or on a cloud server, pose estimation module 214 may determine that the proper mitigation strategy is to do nothing and to delete the captured image data after a predetermined time period.

Moreover, if pose estimation module 214 determines that the occupant safety concern level is high, e.g., by comparing to the observed behavior to a database stored in, e.g., memory 206 or on a cloud server, pose estimation module 214 may determine that the proper mitigation strategy is to record the captured image data, encrypt the recorded image data, and optionally transmit the encrypted image data to an authoritative device, e.g., device used by law enforcement. Additionally or alternatively, pose estimation module 214 may determine that the proper mitigation strategy is to generate an alert, e.g., audible or visual alert, including a warning/reminder to the occupants in vehicle 101 that the captured image data is being recorded, generate and transmit an alert to an emergency services device, e.g., device used by an emergency services provider, and/or cause vehicle 101 to pull over and/or generate an audible alert that may be observed by bystanders.

If pose estimation module 214 detects a vehicle safety concern, e.g., an occupant is damaging vehicle 101, pose estimation module 214 may determine that the proper mitigation strategy is to record the captured image data, encrypt the recorded image data, and optionally transmit the encrypted image data to an authoritative device, e.g., device used by law enforcement. Additionally or alternatively, pose estimation module 214 may determine that the proper mitigation strategy is to generate an alert, e.g., audible or visual alert, including a warning/reminder to the occupants in vehicle 101 that the captured image data is being recorded.

If pose estimation module 214 detects an occupant discomfort, e.g., the occupant appears to be too hot or too cold, the occupant is fidgeting and thus, seated uncomfortably, etc., pose estimation module 214 may determine the type of occupant discomfort and generate a recommendation based on the type of occupant discomfort. For example, if pose estimation module 214 determines that the occupant is too hot within vehicle 101, pose estimation module 214 may generate a recommendation to turn on the air conditioning and/or roll down the window. If pose estimation module 214 determines that the occupant is seated uncomfortably, pose estimation module 214 may generate a recommendation to adjust the seat configuration on which the occupant is sitting, as well determine what seat configuration would be more comfortable for the occupant based on the transformed image data and information stored in a database stored in, e.g., memory 206 or on a cloud server. Further, if pose estimation module 214 determines that the occupant is reading a book, pose estimation module 214 may generate a recommendation to adjust the lighting in vehicle 101. Moreover, pose estimation module 214 may predict occupant discomfort using, e.g., machine learning, based on past behaviors detected by pose estimation module 214, as well as current transformed privacy protected image data based on capture image data in real-time.

Control module interface module 216 may be executed by processor 202 for interfacing with control module 102, to thereby instruct control module 102 to control specific functionalities of vehicle 101. For example, if pose estimation module 214 determines that an audible or visual alert must be displayed, e.g., via speakers of vehicle 101 or display 106, control module interface module 216 may cause control module 102 to cause the speakers and/or display 106 to display the alert. Moreover, if pose estimation module 214 determines that vehicle 101 should pull over, control module interface module 216 may cause control module 102 to cause vehicle 101 to pull over. Further, if pose estimation module 214 determines that an alert should be transmitted to a remote third party device, e.g., an authoritative or emergency services device, control module interface module 216 may cause control module 102 to transmit the alert. Additionally, upon acceptance by an occupant of a recommendation by pose estimation module 214, e.g., verbally or via the graphical user interface of control module 102, control module interface module 216 may cause control module 102 to cause the appropriate adjustment of vehicle 101, e.g., adjust the temperature or lighting, adjust a seat configuration, etc.

Infotainment system interface module 218 may be executed by processor 202 for interfacing with an infotainment system of vehicle 101. The infotainment system may be integrated with at least one of control module 102 or displays 106, such that an occupant may interact with the infotainment system via a graphical user interface. The infotainment system may permit the occupant to play music, play games, and/or other interactive features such as apply mixed reality backgrounds, select digital representations for the transformed image data, etc. Accordingly, infotainment system interface module 218 may receive data from the infotainment system indicative of what games the occupant likes to play or what music the occupant likes to listen too. Moreover, infotainment system interface module 218 may receive image data from camera data processing module 208 indicative of the occupant's physical reactions during the interaction with the infotainment system.

Additionally, infotainment system interface module 218 may transmit information, e.g., data indicative of objects identified by camera data processing module 208 to a remote third party device, e.g., a device used by a seller, and receive, e.g., customized advertisements from the remote third party device. Accordingly, infotainment system interface module 218 may generate mixed reality image data, e.g., different backgrounds, filters, etc., based on, e.g., the customized advertisements and the captured image data. For example, the mixed reality images data may include products of the seller superimposed on the captured image data so the occupant could visualize themselves wearing the product. Further, infotainment system interface module 218 may cause displays 16 to display the customized advertisements based on the objects detected in vehicle 101 from the captured image data. For example, if skis are detected, infotainment system interface module 218 may cause displays 106 to display a commercial advertising ski lessons, if a school bag is detected as well as school aged children, infotainment system interface module 218 may cause displays 106 to display a sample video lecture, and/or if an elderly occupant is detected with a hearing aid, infotainment system interface module 218 may cause displays 106 to display information on the latest performance enhancing wearable technologies.

Figure 3:
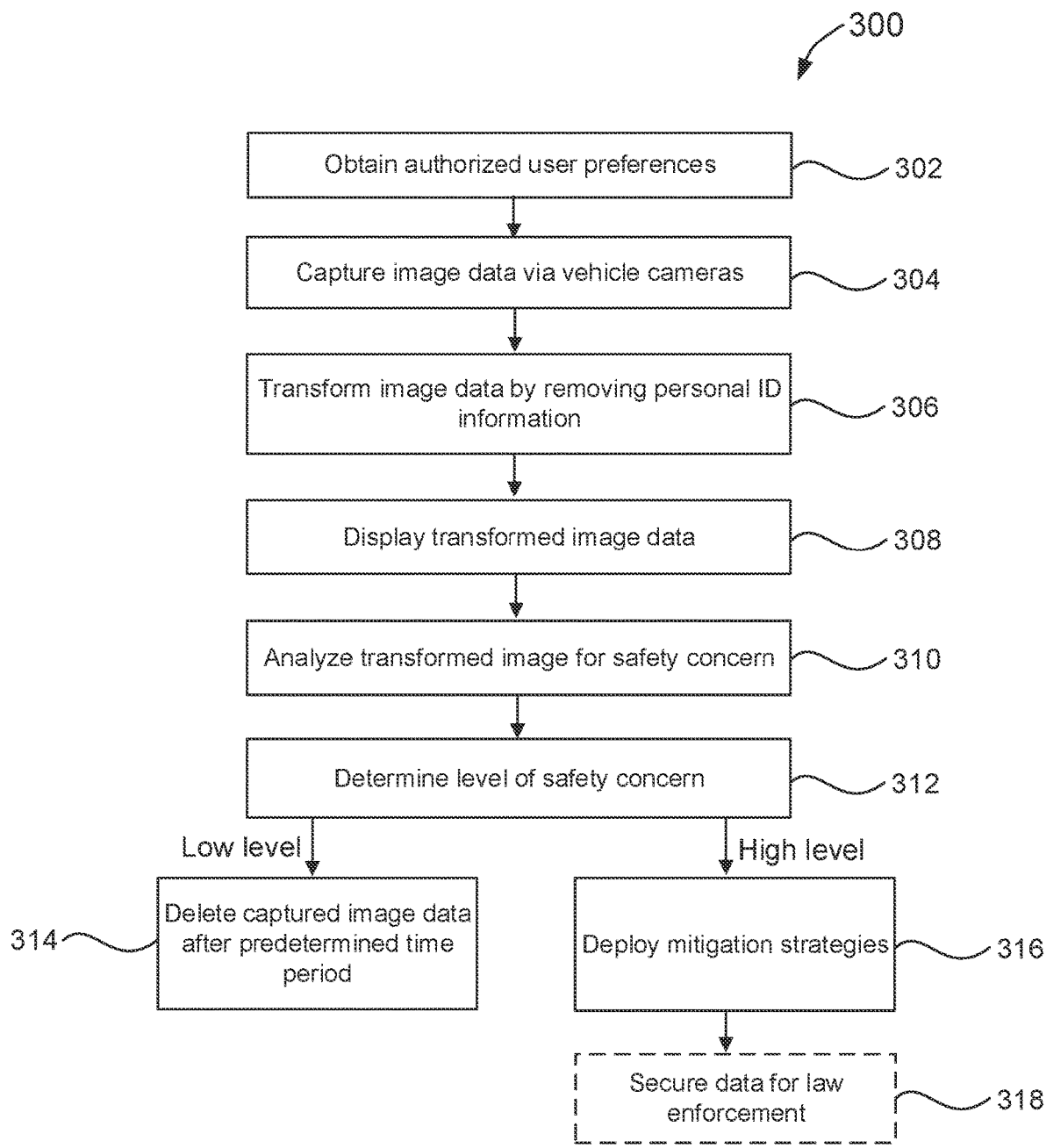
FIG. 3 is a flow chart illustrating exemplary steps for protecting privacy of one or more occupants of an autonomous vehicle in accordance with the principles of the present disclosure.

Referring now to FIG. 3, exemplary method 300 for protecting privacy of one or more occupants of vehicle 101 is provided. At step 302, system 100 may obtain authorization from the occupants of vehicle 101 to be recorded while within vehicle 101. Alternatively, authorization need not be required as personal ID of the occupants are removed from any image data that is recorded. Moreover, the occupants of vehicle 101 may select user preferences, e.g., which digital representations such as stick figures, avatars, celebrity likenesses, etc., via the infotainment system of vehicle 101. In some embodiments, no digital representations need to be preselected, and a default digital representation will be used. At step 304, cameras 104 may capture image data of the interior of vehicle 101 including any occupants in vehicle 101. At step 306, personal ID removal module 210 of PPSCI platform 200 may transform the captured image data by removing any personal ID information of the occupants in the captured image data, and replacing the occupants in the captured image data with the preselected digital representations. At step 308, the transformed image data may be displayed on displays 106 so that the occupants of vehicle 101 may observe their digital representations and take comfort in knowing that their personal ID has been removed and is not being recorded.

At step 310, pose estimation module 214 of PPSCI platform 200 may analyze the transformed image data and detect one or more safety concerns, if any. As described above, pose estimation module 214 may detect the safety concern by comparing the transformed image data with a database and/or via machine learning. For example, pose estimation module 214 may determine that an occupant is not conscious, one occupant is acting aggressively toward another occupant, or an occupant is vandalizing vehicle 101. At step 312, pose estimation module 214 may determine level of the safety concern, e.g., low occupant safety concern, high occupant safety concern, or vehicle safety concern. If the occupant safety concern is determined to be low, at step 314, PPSCI platform 200 may delete the captured image data after a predetermined time period. Captured image data is generally deleted after a predetermined time period, and thus, step 314 may occur even without a safety concern being detected.

If the occupant safety concern is determined to be low, or if a vehicle safety concern is detected, at step 316, pose estimation module 214 may deploy a corresponding mitigation strategy. For example, an audible and/or visual alert may be generated and displayed to warn the occupants of vehicle that they are being recorded, an alert may be transmitted to an emergency services provider along with GPS location data of vehicle 101, and/or vehicle 101 may pull over and an audible alert generated to alert bystanders should interference be necessary. Optionally, at step 318, at least a portion of the captured image data, e.g., the portion including the safety concern/aggressive behavior/vandalism may be encrypted, e.g., via end-to-end encryption, and stored in a secured database, e.g., on memory 206 or on a cloud server. With compliance with local laws and regulations, e.g., upon issuance of a lawful warrant, the stored image data may be transmitted to relevant law enforcement officers.

Figure 4:
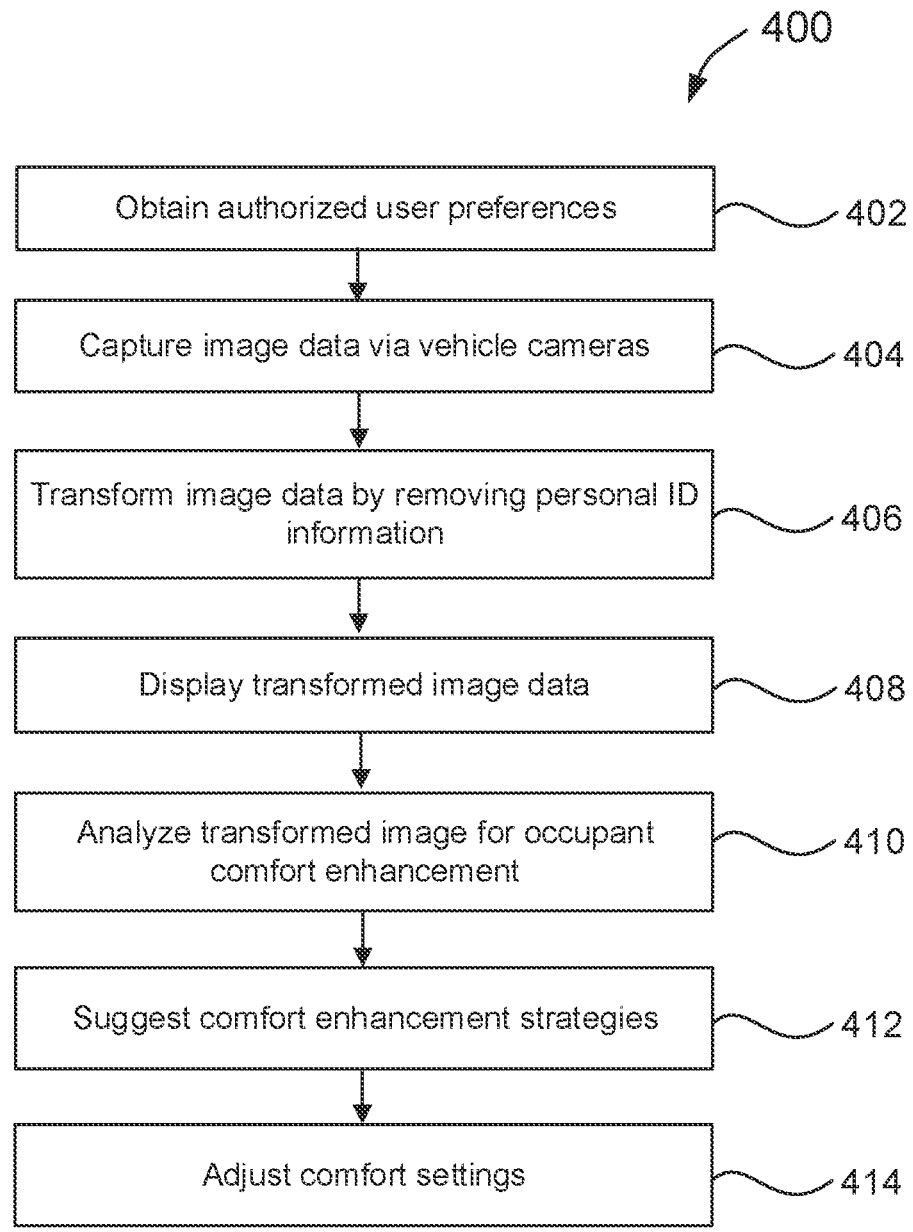
FIG. 4 is a flow chart illustrating alternative exemplary steps for protecting privacy of one or more occupants of an autonomous vehicle in accordance with the principles of the present disclosure.

Referring now to FIG. 4, exemplary method 400 for protecting privacy of one or more occupants of vehicle 101 is provided. Steps 402 to 408 correspond with steps 302 to 308 of FIG. 3 and thus, are not repeated for brevity. At step 410, pose estimation module 214 of PPSCI platform 200 may analyze the transformed image data and detect occupant discomfort, if any. As described above, pose estimation module 214 may detect occupant discomfort by comparing the transformed image data with a database and/or via machine learning. For example, pose estimation module 214 may determine that an occupant is fidgeting and thus not seated comfortably, or is too hot or too cool. At step 412, pose estimation module 214 may generate suggestions of comfort enhancement strategies corresponding to the detected occupant discomfort. For example, pose estimation module 214 may generate a suggestion to adjust a seat configuration, increased or decrease temperature within vehicle 101, open or close a window, and/or play or stop music. Upon receipt of confirmation by the occupant, e.g., either verbally via voice detection or manually via the infotainment system, at step 414, control module interface module 216 may cause control module 102 to make the corresponding adjustment to relieve the occupant discomfort.

Figure 5:
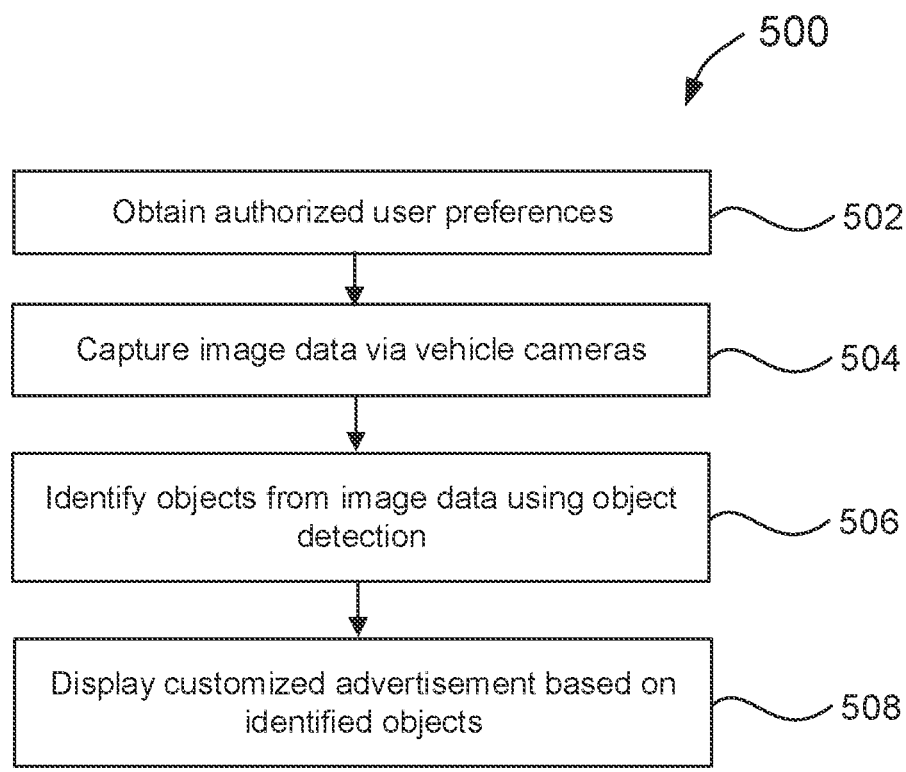
FIG. 5 is a flow chart illustrating exemplary steps for providing infotainment to one or more occupants of an autonomous vehicle in accordance with the principles of the present disclosure.

Referring now to FIG. 5, exemplary method 500 for providing infotainment to one or more occupants of vehicle 101 is provided. Steps 502 and 504 correspond with steps 302 and 304 of FIG. 3 and thus, are not repeated for brevity. At step 506, camera data processing module 208 of PPSCI platform 200 may identify one or more objects within the captured image data, e.g., using object detection software. Information regarding the detected objects may be compared with an internal database and/or be transmitted to participating third parties, e.g., sellers, to generate and/or receive customized advertisements based on the identified objects. At step 508, the customized advertisement may be displayed on displays 106, e.g., as a commercial advertisement, or superimposed on the captured image data as a mixed reality. For example, if an occupant is wearing sunglasses, a digital representation of other branded sunglasses may be displayed over the occupant's sunglasses in the mixed reality on displays 106, so the occupant may observe themselves with the branded sunglasses. Additionally or alternatively, if the occupant has a purse, a commercial advertisement of other branded purses may be displayed on display 106.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A method for protecting privacy of one or more occupants of an autonomous vehicle, the method comprising:

in a first operating mode of the autonomous vehicle and in response to a triggering event, capturing first image data corresponding to video of an interior of the autonomous vehicle via one or more cameras integrated with the autonomous vehicle;

switching from the first operating mode of the vehicle to a second operating mode of the vehicle based on usage patterns, a pre-determined policy, or manual adjustments by one of the one or more occupants of the autonomous vehicle, wherein the first operating mode is a normal mode and the second operating mode is a privacy mode; and operating the autonomous vehicle in the second operating mode, wherein operating the autonomous vehicle in the second operating mode comprises:
continuously capturing second image data corresponding to video of the interior of the autonomous vehicle via the one or more cameras integrated with the autonomous vehicle;
transforming the second image data to remove personal identification information of the one or more occupants of the autonomous vehicle;
comparing observed behavior of the one or more occupants provided in the transformed image data with a database in order to identify a concern;
audibly requesting a response from the one or more occupants based on the concern; and
responsive to not receiving the response from the one or more occupants, deploying a mitigation strategy based on the concern.

2. The method of claim 1, wherein the transformed image data comprises one or more digital avatars corresponding with the one or more occupants of the autonomous vehicle, and wherein the method further comprises employing machine learning to identify the concern in addition to comparing observed behavior of the one or more occupants provided in the transformed image data with the database.

3. The method of claim 1, wherein the concern comprises an occupant safety concern, the method further comprising determining a level of the occupant safety concern based on a predetermined threshold, recording response data corresponding to not receiving the response from the one or more occupants, and employing the response data with deep learning models to extract information of additional occupants riding in the interior in the future.

4. The method of claim 3, wherein, if the level of the occupant safety concern is low based on the predetermined threshold, deploying the mitigation strategy comprises deleting the captured image data after a predetermined time period.

5. The method of claim 3, wherein, if the level of the occupant safety concern is high based on the predetermined threshold, deploying the mitigation strategy comprises:
storing a portion of the captured image data; and
transmitting the portion of the captured image data to an authoritative device.

6. The method of claim 5, wherein deploying the mitigation strategy further comprises encrypting the portion of the captured image data, and wherein the storing the portion of the captured image data comprises storing the portion of the captured image data in a secured database.

7. The method of claim 3, wherein, if the level of the occupant safety concern is high based on the predetermined threshold, deploying the mitigation strategy comprises generating an alert indicative of a warning that video is being recorded.

8. The method of claim 3, wherein, if the level of the occupant safety concern is high based on the predetermined threshold, deploying the mitigation strategy comprises transmitting an alert to an emergency services device, the alert comprising a location of the autonomous vehicle.

9. The method of claim 3, wherein, if the level of the occupant safety concern is high based on the predetermined threshold, deploying the mitigation strategy comprises: pulling over the autonomous vehicle; and
generating an audible alert.

10. The method of claim 1, wherein the observed behavior comprises at least one of a state of consciousness of any of the one or more occupants, an aggression level of any one of the one or more occupants, and a vandalizing behavior toward the autonomous vehicle by any one of the one or more occupants, and wherein switching from the first operating mode of the vehicle to the second operating mode of the vehicle is based on the manual adjustments by the one of the one or more occupants of the autonomous vehicle.

11. The method of claim 10, wherein deploying the mitigation strategy comprises generating an alert indicative of a warning that video is being recorded.

12. The method of claim 10, wherein deploying the mitigation strategy comprises:
storing a portion of the captured image data; and
transmitting the portion of the captured image data to an authoritative device.

13. The method of claim 1, wherein switching from the first operating mode of the vehicle to the second operating mode of the vehicle is based on the usage patterns of the autonomous vehicle, wherein the concern comprises an occupant discomfort, the method further comprising determining a type of the occupant discomfort based on the captured image data.

14. The method of claim 13, wherein deploying the mitigation strategy comprises generating a recommendation based on the type of the occupant discomfort.

15. The method of claim 14, further comprising adjusting one or more comfort settings of the autonomous vehicle upon acceptance of the recommendation by the one or more occupants of the autonomous vehicle.

16. The method of claim 1, further comprising displaying the transformed image data via a display of the autonomous vehicle, and wherein switching from the first operating mode of the vehicle to the second operating mode of the vehicle is based on the pre-determined policy.

17. A system for protecting privacy of one or more occupants of an autonomous vehicle, the system comprising:
a memory that stores computer-executable instructions; and
a processor configured to access the memory and execute the computer-executable instructions to:
cause the autonomous vehicle to operate in a first operating mode in response to a triggering event, wherein operate in the first operating mode includes capturing first image data corresponding to video of an interior of the autonomous vehicle via one or more cameras integrated with the autonomous vehicle;
switch from the first operating mode of the vehicle to a second operating mode of the vehicle based on usage patterns, a pre-determined policy, or manual adjustments by one of the one or more occupants of the autonomous vehicle, wherein the first operating mode is a normal mode and the second operating mode is a privacy mode;
operate the autonomous vehicle in the second operating mode, wherein operate the autonomous vehicle in the second operating mode comprises:
cause the one or more cameras integrated with the autonomous vehicle to continuously capture second image data corresponding to video of the interior of the autonomous vehicle;
transform the second image data to remove personal identification information of the one or more occupants of the autonomous vehicle;

cause a display integrated with the autonomous vehicle to display the transformed image data;

compare observed behavior of the one or more occupants provided in the transformed image data with a database in order to identify a concern;

audibly request a response from the one or more occupants based on the concern; and responsive to not receiving the response from the one or more occupants, deploy a mitigation strategy based on the concern.

18. The system of claim 17, wherein the concern comprises at least one of an occupant safety concern, a vehicle safety concern, or an occupant discomfort.

19. A method of infotainment for one or more occupants of an autonomous vehicle, the method comprising:

capturing image data indicative of an interior of the autonomous vehicle via one or more cameras integrated within the autonomous vehicle;

identifying one or more objects from the captured image data;

sending object data corresponding to the one or more objects to a remote third party device of a seller so that the seller can solicit business from the one or more occupants;

receiving one or more customized advertisements from the remote third party device; and displaying the one or more customized advertisements based on the one or more objects, wherein the one or more customized advertisements comprise mixed reality image data based on the captured image data, and wherein the mixed reality image data comprises products of the seller superimposed on the captured image data.

* * * * *